US007734906B2

(12) United States Patent
Orlando et al.

(10) Patent No.: US 7,734,906 B2
(45) Date of Patent: *Jun. 8, 2010

(54) SYSTEM AND METHOD FOR PANEL LINKING IN A SECURITY SYSTEM

(75) Inventors: Robert J. Orlando, Nesconset, NY (US); Scott Simon, Huntington, NY (US); Gordon G. Hope, Jr., Miller Place, NY (US); Damian J Tallini, Coram, NY (US); Metin L. Goklevent, Massapequa Park, NY (US); Francis C Marino, Dix Hills, NY (US)

(73) Assignee: Honeywell International Inc., Morristown, NJ (US)

( * ) Notice: Subject to any disclaimer, the term of this patent is extended or adjusted under 35 U.S.C. 154(b) by 972 days.

This patent is subject to a terminal disclaimer.

(21) Appl. No.: 11/055,511

(22) Filed: Feb. 10, 2005

(65) Prior Publication Data

US 2005/0149717 A1  Jul. 7, 2005

Related U.S. Application Data

(63) Continuation of application No. 10/099,141, filed on Mar. 13, 2002, now Pat. No. 6,868,493.

(51) Int. Cl.
*H04L 29/00* (2006.01)
*G06F 17/30* (2006.01)
*G08B 9/00* (2006.01)

(52) U.S. Cl. .................... 713/150; 726/2; 340/539.17; 340/286.01

(58) Field of Classification Search ............... 709/223; 713/150, 201, 181, 200; 370/250, 401, 254; 380/45, 51; 379/40, 39, 102; 702/188; 375/240; 726/2; 340/539.17, 286.01
See application file for complete search history.

(56) References Cited

U.S. PATENT DOCUMENTS

| 4,503,287 | A | * | 3/1985 | Morris et al. ................. 380/45 |
| 4,918,717 | A | * | 4/1990 | Bissonnette et al. ........... 379/40 |
| 5,134,644 | A | * | 7/1992 | Garton et al. ................. 379/39 |
| 6,075,776 | A | * | 6/2000 | Tanimoto et al. ............ 370/254 |
| 6,101,189 | A | * | 8/2000 | Tsuruoka ..................... 370/401 |
| 6,385,495 | B1 | * | 5/2002 | Bennett ....................... 700/86 |

(Continued)

FOREIGN PATENT DOCUMENTS

JP          03192458          8/1991

(Continued)

*Primary Examiner*—Kambiz Zand
*Assistant Examiner*—William S Powers
(74) *Attorney, Agent, or Firm*—Barkume & Associates, P.C.

(57) ABSTRACT

A security system comprising a plurality of security subsystems each of the security subsystems being discretely located, typically in separate buildings. The security subsystems are interconnected by a system communications bus to enable bi-directional communication between the security subsystems. Each of the security subsystems comprises a user interface, a control panel, a plurality of security devices, a local communications bus, and a panel linking gateway. The panel linking gateway allows data on the local communications bus of each security subsystem to be transmitted to and received from the system communications bus. The security system allows a keypad or other user interface from one security subsystem to access and control a second remote security subsystem.

15 Claims, 8 Drawing Sheets

U.S. PATENT DOCUMENTS

| | | | |
|---|---|---|---|
| 6,480,901 B1* | 11/2002 | Weber et al. | 709/223 |
| 6,529,589 B1* | 3/2003 | Nelson et al. | 379/102.01 |
| 6,553,336 B1* | 4/2003 | Johnson et al. | 702/188 |
| 6,744,771 B1* | 6/2004 | Barber et al. | 370/400 |
| 2001/0006551 A1* | 7/2001 | Masaki | 380/51 |
| 2001/0029585 A1* | 10/2001 | Simon et al. | 713/200 |
| 2002/0111698 A1* | 8/2002 | Graziano et al. | 700/17 |
| 2003/0061511 A1* | 3/2003 | Fischer | 713/201 |
| 2003/0110372 A1* | 6/2003 | Proudler | 713/150 |
| 2003/0204731 A1* | 10/2003 | Pochuev et al. | 713/181 |
| 2005/0041734 A1* | 2/2005 | Walker et al. | 375/240.01 |
| 2005/0149717 A1* | 7/2005 | Orlando et al. | 713/150 |
| 2005/0204126 A1* | 9/2005 | Watson | 713/150 |
| 2005/0246522 A1* | 11/2005 | Samuelsson et al. | 713/150 |
| 2005/0278524 A1* | 12/2005 | Diehl et al. | 713/150 |

FOREIGN PATENT DOCUMENTS

| | | |
|---|---|---|
| WO | WO00/51096 | 8/2000 |

\* cited by examiner

| DATA TYPE (01h) | DESTINATION PANEL # (2 BYTES, BIT MAPPED) | SOURCE PANEL # (1 BYTE, ENCODED) | SOURCE PARTITION # (1 BYTE, ENCODED) | ALPHA+FIXED DATA (32 ALPHA+L0-L3) |

FIG.4A

| DATA TYPE (02h) | DESTINATION PANEL # (2 BYTES, BIT MAPPED) | SOURCE PANEL # (1 BYTE, ENCODED) | DESTINATION PARTITION # (1 BYTE, ENCODED) | # OF KEYS IN PACKET (1 BYTE, ENCODED) | KEYS DATA (6 BYTES) |

FIG.4B

| DATA TYPE (03h) | SOURCE PANEL # (1 BYTE, ENCODED) |

SYSTEM AND METHOD FOR PANEL LINKING IN A SECURITY SYSTEM

CROSS REFERENCE TO RELATED APPLICATION

This application is a continuation application of U.S. application Ser. No. 10/099,141, filed on Mar. 13, 2002, now U.S. Pat. No. 6,868,493.

BACKGROUND OF THE INVENTION

This invention relates to communication between multiple security systems, and in particular to security systems that allow a keypad from one security system to access and control a number of remote security systems using an established communications bus.

Many companies today occupy a number of buildings in a "campus" or "office complex" type environment, wherein the multiple buildings are within close proximity of each other and monitored for security by a common security office. Typically each building in the complex is secured by its own individual alarm system. These alarm systems are controlled by keypads, consoles, and other user interface devices to allow humans to manage security features such as: arming, disarming, and limiting access within the premises. In the campus environment it is necessary for security personnel to walk from building to building to turn the security systems off, or disarm the system, for access to the buildings during working hours and again walk from building to building to turn the security systems on, or arm the system, for security during non-working hours. The security personnel must then monitor the individual status of each alarm system, to insure security, by walk from building to building to check the status displayed by the system's keypads. When there is an alarm condition, the security personnel must walk to the building to view the building's keypad to determine type of alarm condition present, thereby putting themselves in unnecessary danger.

It is therefore an object of the present invention to provide a security system that allows user interfaces from one security system to connect or link up to another remote security system.

It is a further object of the present invention to provide a security system that allows a user to remotely view the status of another security system.

It is a further object of the present invention to provide a security system that allows a user to remotely control another security system.

It is a further object of the present invention to provide a security system that can limit users from accessing an associated security system with a higher level of security.

It is a further object of the present invention to automatically disconnect a user interface from an associated security system after the user interface is inactive for a period of time.

SUMMARY OF THE INVENTION

In accordance with these and other objects, the present invention is a security system comprising a plurality of security subsystems, or associated security systems, each of the security subsystems being discretely located, typically in separate buildings. The security subsystems are interconnected by a system communications bus to enable bi-directional communication between the security subsystems. Each of the security subsystems comprises a user interface, a control panel, a plurality of security devices, a local communications bus, and a panel linking gateway (PLG). The PLG allows data on the local communications bus of each security subsystem to be transmitted to and received from the low cost system communications bus.

The panel linking gateway, which includes a microprocessor and other interface hardware, communicates with both the local communications bus, using a first protocol for communications such as ADEMCO's Expanded Console Protocol (ECP), and the system communications bus, using a second protocol for communications such as the RS485 standard. When a command is sent by the local security subsystem control panel that contains an address of a remote security subsystem, the panel linking gateway reads the data from the local communications bus, processes the data from the first protocol to conform to the second protocol, and transmits the processed data, containing the remote address, to the system communications bus. The panel linking gateway of the remote security subsystem then detects its address on the system communications bus and reads the data from the system communications bus, processes the data from the second protocol to conform to the first protocol, and transmits the processed data, containing the address of one of its components, to the local communications bus to be processed by its control panel.

In order to allow a user interface, typically a keypad, in one security subsystem to access status from and input control codes to a second remote security subsystem, the control panel for each security subsystem contains a table with a list of associated user interfaces and a table with a list of linked user interfaces in its memory. During installation, the table of associated user interfaces is programmed with each user interface address and partition number, which is the section of the building the user interface controls. When a control panel receives a link request from a user interface, the control panel removes the user interface from the table of associated user interfaces by clearing its link bit and adds the user interface to the table of linked user interfaces along with the address of the second remote panel the user interface will be linked to. The linked user interface is then updated with information from the second remote control panel as if it is physically connected to the secondary remote security subsystem. After a period of inactivity from the user interface, the user interface is re-associated with its original security subsystem.

The steps to linking a user interface to a second control panel are: a) a user must enter a link request code into the user interface, the request code comprising an identification of the second control panel, b) the control panel associated with the user interface requests the second control panel to link to the user interface, c) the second control panel verifies permission to link to the user interface, d) if the second control panel has such permission then: the second control panel confirms the link request to the requesting control panel, the requesting control panel disassociates the user interface, and links the user interface to the second control panel; and e) if the second control panel has no such permission, then the second control panel denies the link request to the requesting control panel.

Many of the security systems on the market today have control panels that contain partitions. The partitions allow sections of the building to be monitored and controlled by a user interface separately from other sections of the building. In this type of arrangement, when linking a user interface to a second security subsystem, the user interface is linked to a partition of a second security subsystem and the partition number of the second security subsystem is part of the request code and is contained in the table linked user interfaces.

In order to limit access in the security system, a user must also enter a user identification code when entering the link request code into a user interface. The control panel to be linked verifies permission based on the user identification code and additional information programmed during installation of the security subsystems. The additional information may comprise a list of user ID's that can be linked to a particular partition for the user code entered. This allows different levels of security in different sections of different buildings.

DETAILED DESCRIPTION OF THE PREFERRED EMBODIMENT

Figure 1:
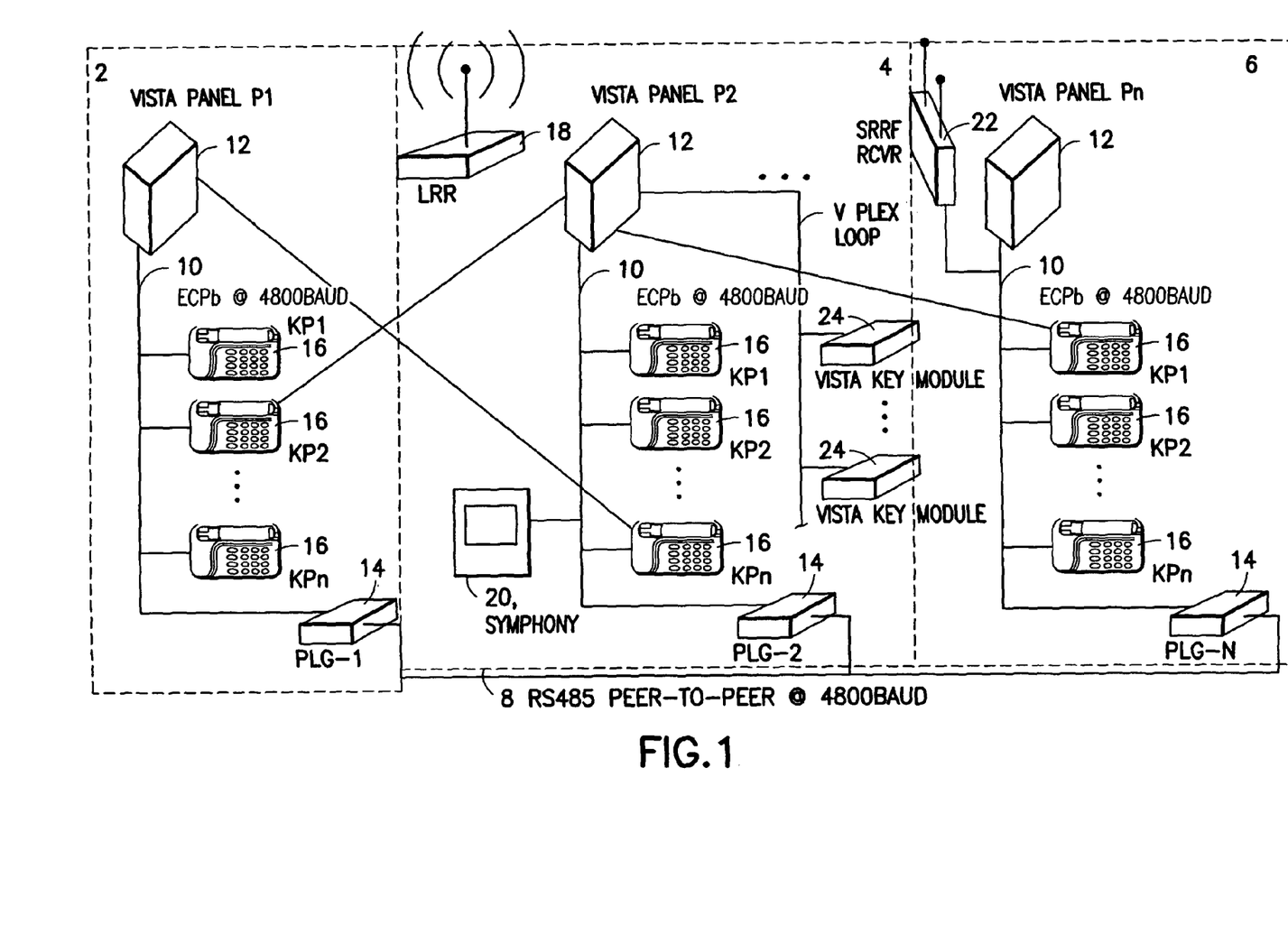
FIG. 1 is a system diagram of the present invention.

Referring to FIG. 1, shown is a security system 1 containing three security subsystems 2, 4, and 6. The security subsystems 2, 4, and 6 are connected to each other through communications bus 8, which is an RS485 UART-based, peer-to-peer protocol without clash detection. An RS485 bus is a standard communications bus with a baud rate of 4800 that allows communication over long distances and is well known in the art. Theoretically there may be any number of security subsystems connected to the RS485 bus 8, but only three are shown here. Each security subsystem 2, 4, and 6 contains a panel 12, an ECP bus 10, a panel linking gateway (PLG) 14, and a number of user interfaces including keypads 16, long range radio 18, symphony 20 (a graphical user interface that operates like a keypad but has a touch sensitive screen to control the actions of the panel), short range RF receiver 22, and key modules 24. Each security subsystem 2, 4, and 6, also includes a number of sensors, not shown, that sense if an intruder has entered the area being monitored by the security subsystem 2, 4, and 6. These sensors may include motion sensors, window sensors, door sensors, and glass break detectors. The panel 12 is a typical security controller comprising a processor, memory, interface circuits, etc. The ECP bus 10 is an internal communications bus that utilizes a UART-based, polling protocol. The details of the ECP bus 10 are not described here because any standard bus may be substituted in the present invention. The PLG 14 will be described below. As standard with security systems, the panel 12 receives command codes from the user interfaces 16, 18, 20, 22 and 24 and data from the sensors via the ECP bus 10. The panel 12 processes the command codes, which may for instance indicate to arm the security subsystem 2, 4, or 6. The sensor data is then monitored by the panel 12 to determine if an intruder has entered the area being secured. If at any time an intruder does enter the premises, the panel 12 sounds an alarm. When the user wants to access the premises, he enters a disarm code into the keypad 16 (or other user interface), which causes the panel 12 to disregard the sensor data.

The security subsystems 2, 4, and 6 shown contain a number or keypads 16, each keypad 16 controls a partition of the security subsystem 2, 4, or 6. For example, each panel 12 monitors sensor devices in an entire building, but different partitions, areas or floors, are controlled by different keypads 16 and may be armed or disarmed at different times. Other devices such as LRR 18, short range RF receivers 22, key modules 24, and symphony 20 may also transmit codes to the panel 12 or receive information from the panel 12 to transmit to a user. The operation of the security subsystem described here, including the sensors, the panel 12, the ECP bus 10 and the user interfaces 16, 18, 20, 22, and 24, are well known to one skilled in the art. The inventive components of the present invention is the use of the PLG 14, which connects the security subsystems 2, 4, and 6 to the RS485 bus 8, and the processing software programmed in the panels 12 that "links" a keypad 16 from one security subsystem 2, 4, or 6 to a partition of a different security subsystems 2, 4, or 6. When a keypad 16 is linked to a partition of a different security subsystem 2, 4, or 6 it is able to act as if it were connected to the ECP bus 8 of that security subsystem 2, 4, or 6. An example of a linked keypad is shown in FIG. 1 by the dotted lines. A user at the location monitored by security subsystem 2 is able to put codes into keypad 16-KP2 that arms a partition of security subsystem 4 at a different location. Another example is a user at the location of keypad 16-KP1 of security subsystem 6 can receive status from a partition of security subsystem 4 located at a different site. Lastly a user at keypad 16-KPn from security subsystem 4 can disarm a partition of security subsystem 2.

Figure 2:
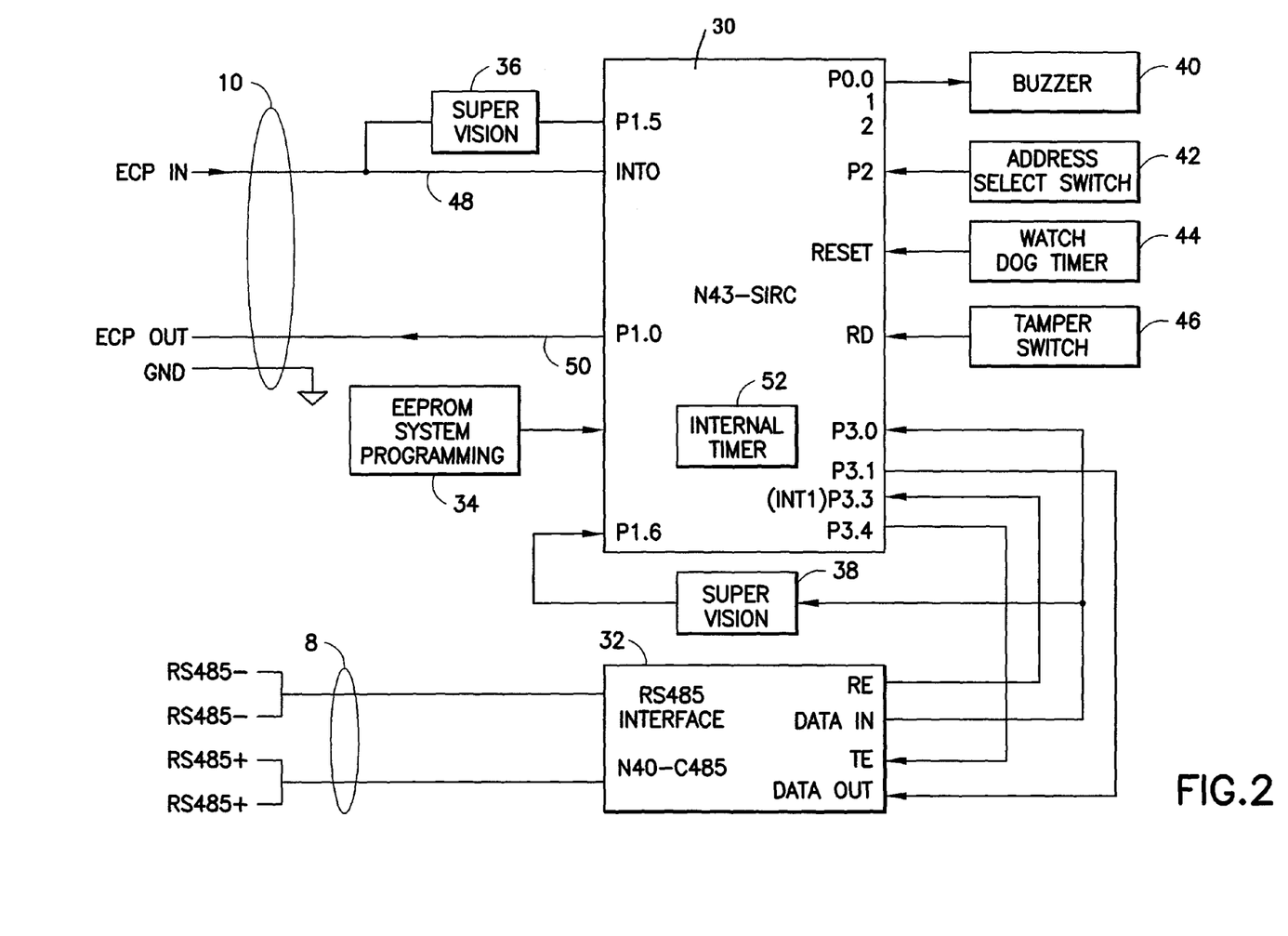
FIG. 2 is a block diagram of the preferred embodiment of the panel linking gateway.

FIG. 2 shows a block diagram of the PLG 14. The PLG 14 is primarily comprised of a microprocessor 30, memory 34, and an RS485 interface processor 32. Data comes from the ECP bus 10 on input line 48, is processed by the microprocessor 30 using software programmed in memory 34, is then transmitted to the RS485 processor 32, which transmits the processed data to the RS485 bus 8. In addition, data comes from the RS485 bus 8 to the RS485 interface processor 32, which handles the RS485 interface protocol and stores the data received on the RS485 bus. The processor 30 polls the RS485 interface processor 32 for data when the panel 12 requests data from the PLG 14, and when the data is present reads the data from the RS485 processor 32, processes it, and transmits it to the ECP bus 10 on ECP out 50. The internal timer 52 is used to synch the processor 30 with the data rate of the ECP bus 10, allowing data to be received and transmitted at the 4800-baud rate. The address select switch 42 is a dipswitch set during installation for the address of the PLG 14 on the ECP bus 10. The Buzzer 40 is to locate a misfunctioning PLG. The watch dog timer 44 keeps the PLG 14 from locking up, and the supervision circuits 36 and 38 detect if the ECP bus and the RS485 bus are busy, respectively. The interface between the PLG 14 and the RS485 is a standard UART based communications that is well known in the art and will not be described here.

Figure 3A:
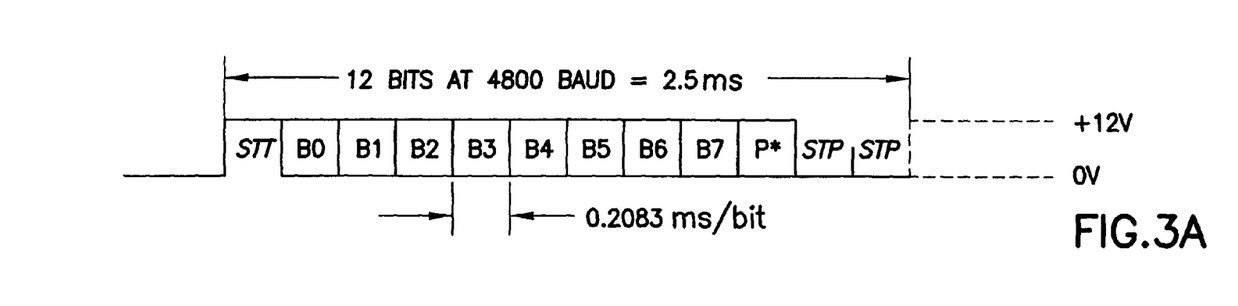
FIGS. 3A-3C are data formats for the ECP bus.
Figure 3B:
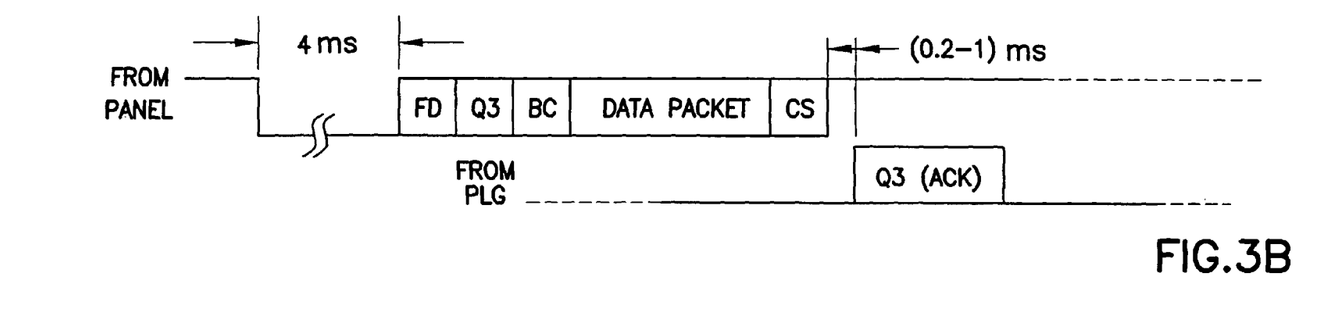

The interface between the PLG 14 and the ECP bus 10, which is performed by the processor 30 with software programmed in EEPROM 34, is as follows: input data on the ECP bus 48 interrupts the processor 30 causing the processor 30 to input the data and check the first data word to determine if the data should be processed by the processor 30, or ignored because the data is addressed to a different component on the ECP bus 10. FIG. 3A shows the byte data format for the ECP bus 10 (same as the RS485 bus 8). As typical on a standard UART based communications bus, there is a start bit STT, eight bits of data B0-B7, a parity bit P, and two stop bits STP. FIG. 3B shows the panel 12 transmitting a data packet to the PLG 14. A synch pulse of 4 ms is followed by the first data word, which contains the code FD that signals to the PLG 14 that the data is to be processed by the PLG 14. The second data word Q3 contains the PLG's ECP address. The next data words contain the number of bytes to follow —byte count BC, the data packet (described below), and the checksum CS.

Figure 3C:
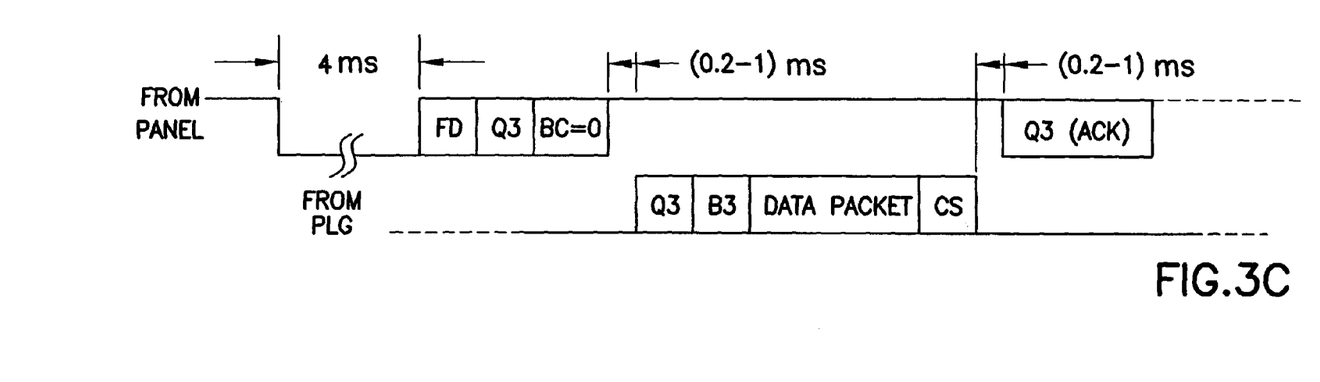

Once the PLG 14 receives the data packet it sends an acknowledge signal with the PLG's ECP address. FIG. 3C shows the panel 12 requesting a data packet from the PLG 14. After 4 ms the first data word FD signals a transmission to the PLG 14. The second word contains the ECP bus address of the panel 12 and the third word, the byte count BC, is equal to zero. The PLG 14 in return sends the PLG's ECP address, the byte count BC, the data packet, and a checksum CS. The panel 12 then acknowledges the receipt of the data.

Figure 4A:
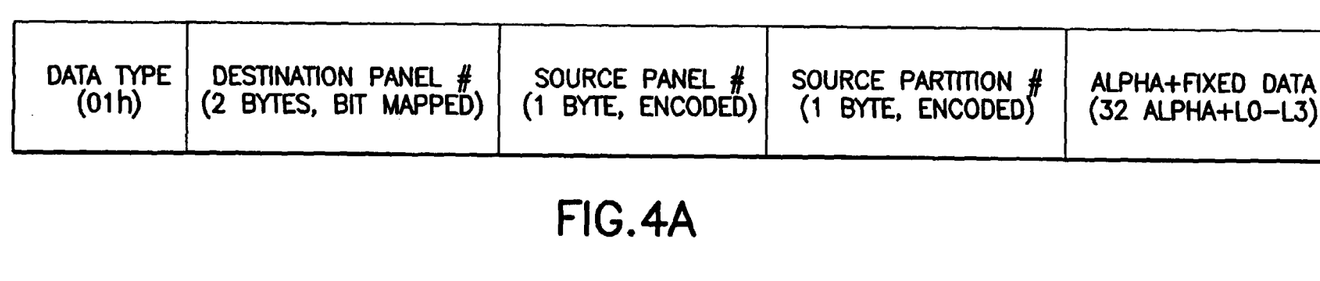
FIGS. 4A-4C are data packet formats.
Figure 4B:
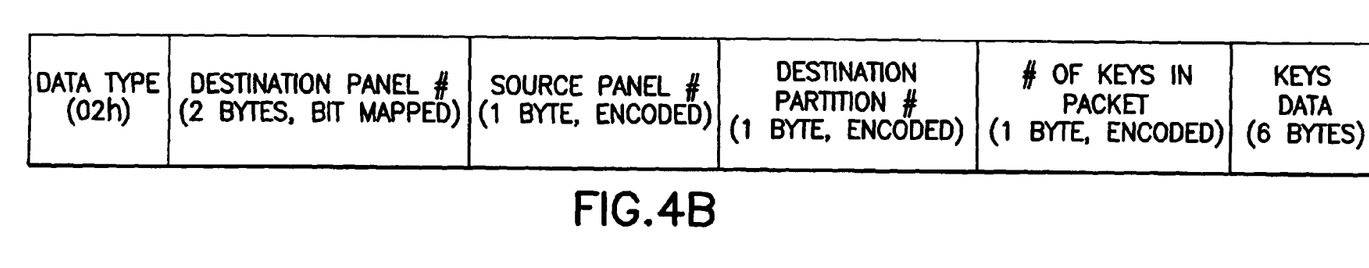
Figure 4C:
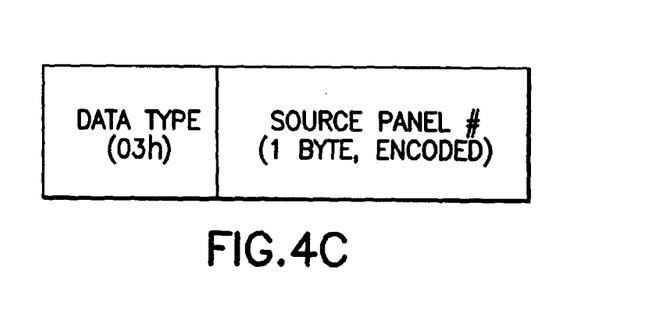

Several examples of data packet formats are shown in FIGS. 4A-4C. These examples are representative of the formats used by the many different data packet in the present invention. One skilled in the art will recognize that any number of formats may be used. FIG. 4A shows the format of partition data sent from a panel 12 to another linked panel 12. The data type—01h—indicates a sending of data, the destination panel # is the panel 12 address, the source panel # is the panel 12 address sending the data, the source partition # is area of the security subsystem 2, 4, or 6 that the data is sent from, and the alpha & fixed data is the data sent. FIG. 4B shows the format the panel 12 uses to send keypad 16 codes to another linked panel. The data type—02h—indicates a sending of key codes. The destination panel #, the source panel #, and the destination partition #, are as described. The # of keys in packet is the number of key codes and the key data are the codes. FIG. 4C shows the format if the panel 12 sending its PLG 14 its own panel link #. The panel link # is used by the PLG 14 to determine if data on the RS485 bus 8 should be transmitted to the panel 12 the PLG 14 is connected to. The data packet shown in FIG. 4C is an example of a data packet not transmitted to the RS485 bus 8. The information in this data packet is used to program the processor 30 and RS485 interface processor 32. The data packets shown in FIGS. 4A and 4B are examples of data packets transmitted to the RS485 bus 8 via the RS485 interface processor 32. The flow of data packets through the entire security system 1 will be more fully described below.

Figure 5:
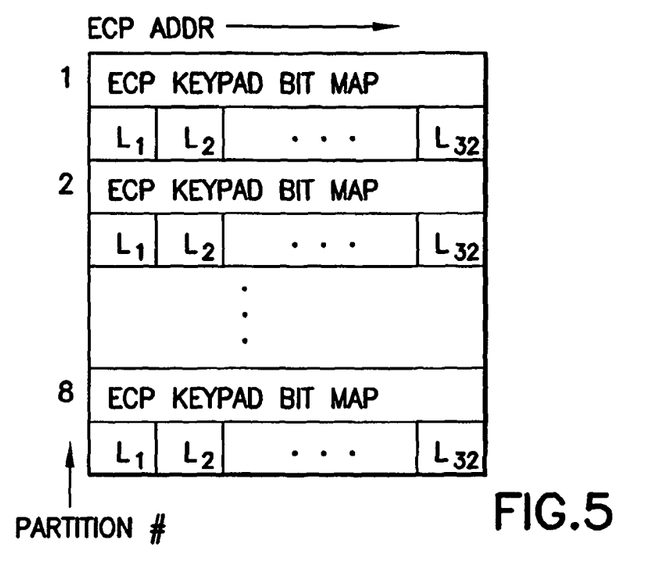
FIG. 5 is the table of associated user interfaces.
Figure 6:
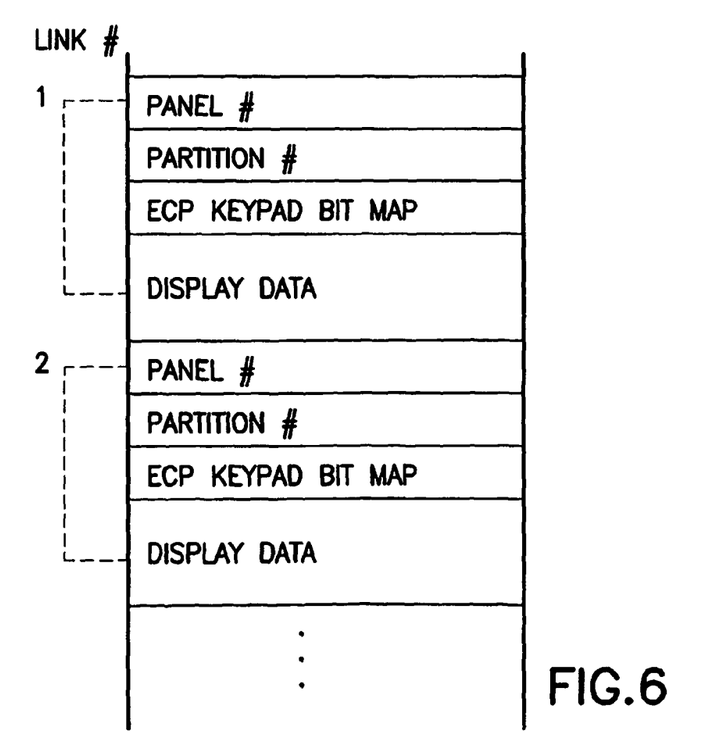
FIG. 6 is the table of linked user interfaces.

The second component of the present invention is the linking software programmed in the panel 12 that allows a keypad 16 to be linked to a partition of a different security subsystem 2, 4, or 6. The general software for operating a security system is comprised of a number of routines that handle installation, ECP bus 10 interface, commands from the user interfaces 16, 18, 20, 22, and 24, sensor data processing, transmissions to the user interfaces 16, 18, 20, and 24, transmissions to alarm sirens and dialer, etc. These routines will not be described because they are well known to one skilled in the art. The linking software of the present invention is comprised of number of routines that interface codes and data to and from the keypads 16 with data to and from the PLG 14. An operational flow diagram of these routines will be described below. The unique feature of the linking software is the use of two tables to keep track of when a user interface is connected to its original local partition and when it is connected to a linked partition. The two tables are (1) the table of associated user interfaces that contains a list of the associated keypads 16 and their bit maps, and (2) the table of linked user interfaces that contains a list of linked keypads 16 and their linked addresses, shown in FIGS. 5 and 6. The table of associated user interfaces and the table of linked user interfaces allows the linking software to disassociate a keypad 16 with a local partition and link the same keypad 16 with a partition of a remote panel 12. The table of associated user interfaces is set during installation, where an installer sets the address of all the components (sensors, user interfaces 16-24, and the PLG 14) connected to the ECP bus 10, by selecting dip switches on the components, and programs the component's partition, characteristics, and address into the panel 12. The panel 12 then loads the addresses and the partition numbers of the keypads 16 into the table of associated user interfaces as shown in FIG. 5. During normal operation the panel 12 uses the table of associated user interfaces when transmitting information to and receiving information from its associated keypads 16. During a link mode, the panel 12 clears the bit "Ln" (where n=ECP address of keypad) of the partition that the keypad belongs to in the table of associated user interfaces. The panel 12 then adds the keypad 16 to be linked to the table of linked user interfaces, shown in FIG. 6, which contains the panel # the keypad 16 will be linked to, the partition # the keypad 16 will be linked to, the keypad 16 address, and the display data sent from the linked panel 12. The panel 12 uses the table of associated user interfaces and the table of linked user interfaces to updated the keypad 16 display with data from the linked partition rather than with data from the keypad's 16 local partition. The panel 12 also uses the table of linked user interfaces when sending keypad 16 codes to the linked partition. After 90 seconds of inactivity from the keypad 16, all data is cleared from the table of linked user interfaces for that link and the "Ln" bit is set in the respective partitions by the panel 12 allowing it to return back to normal operation.

Figure 7:
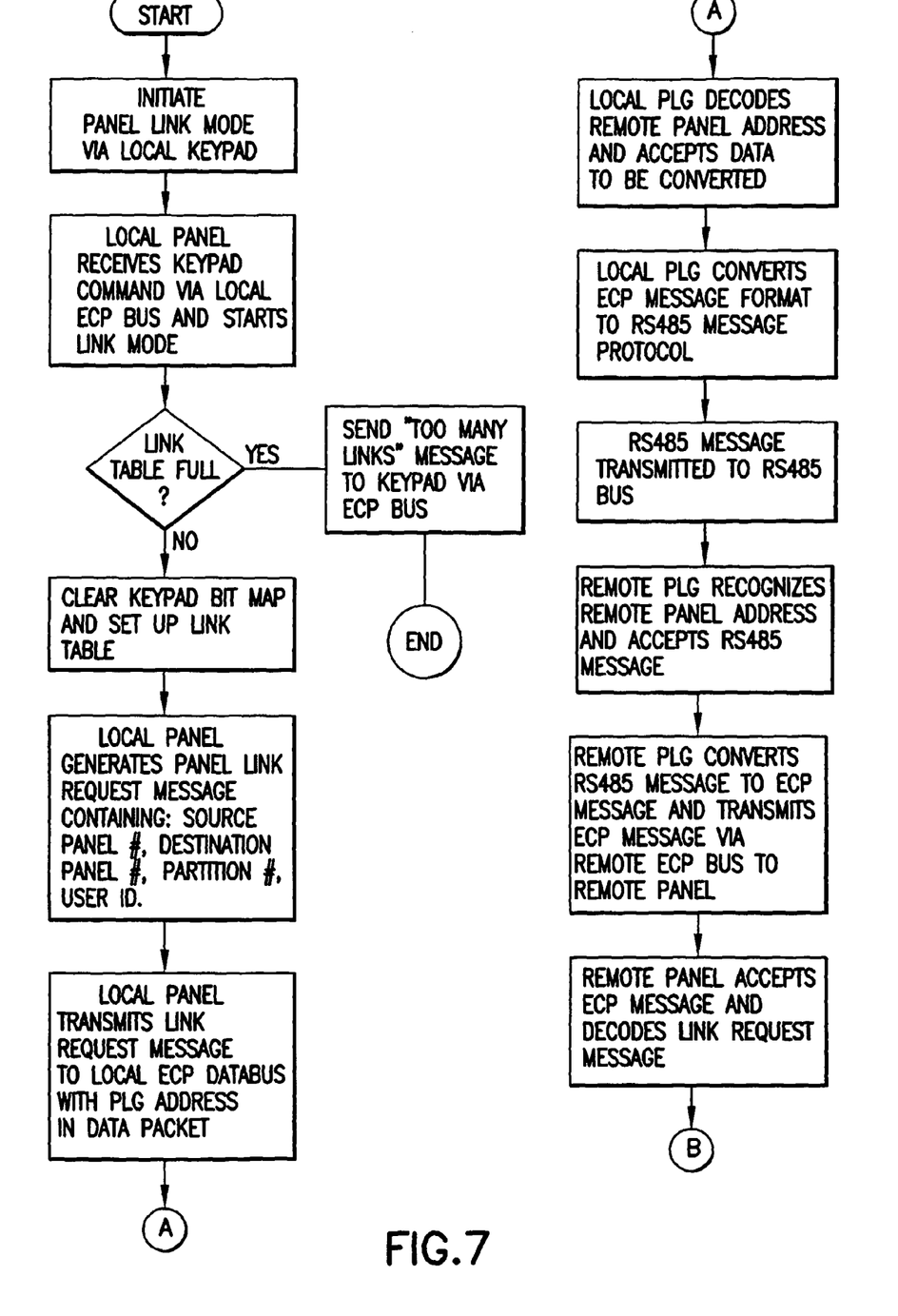
FIGS. 7-9 are flowcharts of the operation of the present invention.
Figure 8:
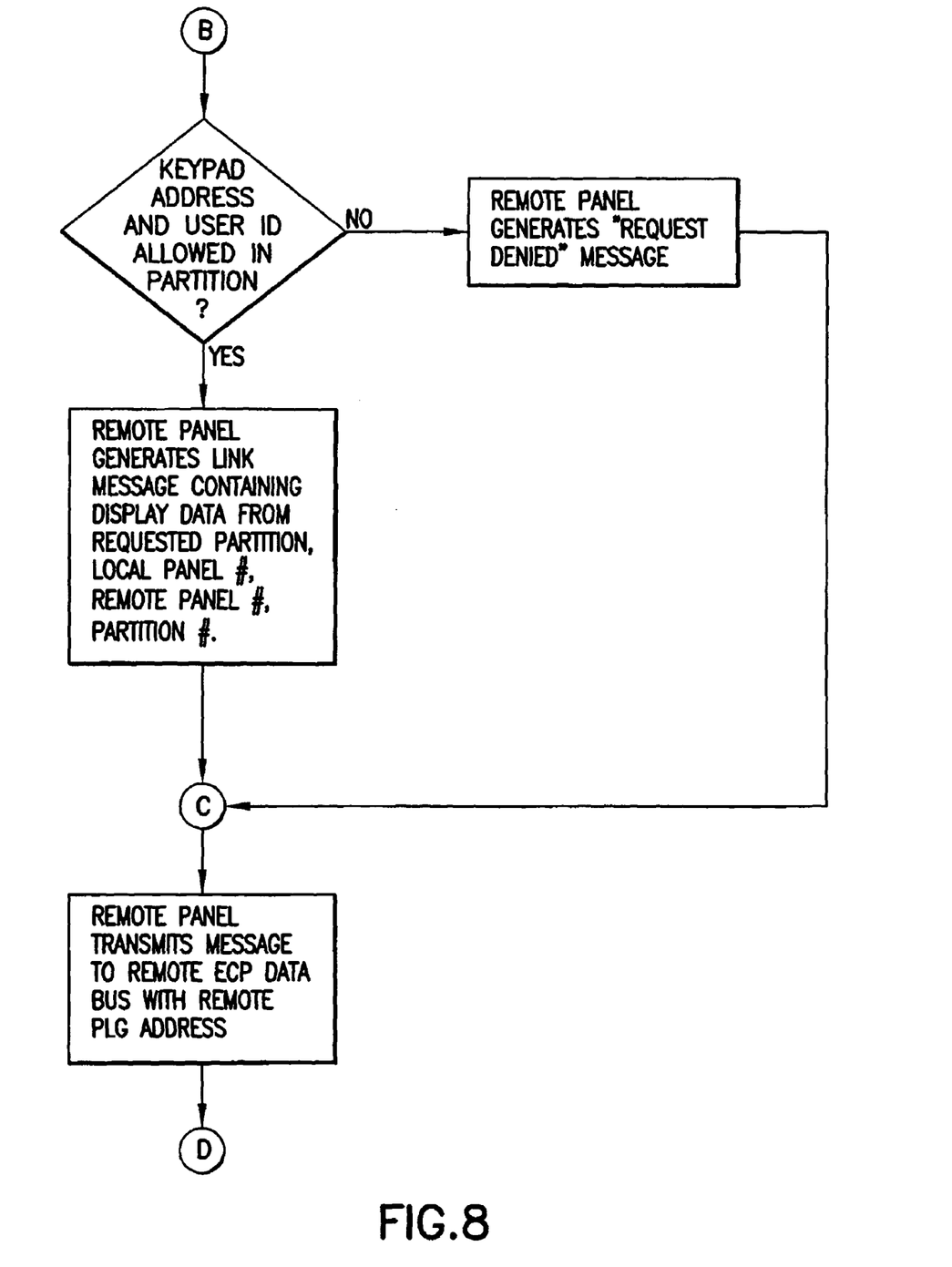
Figure 9:
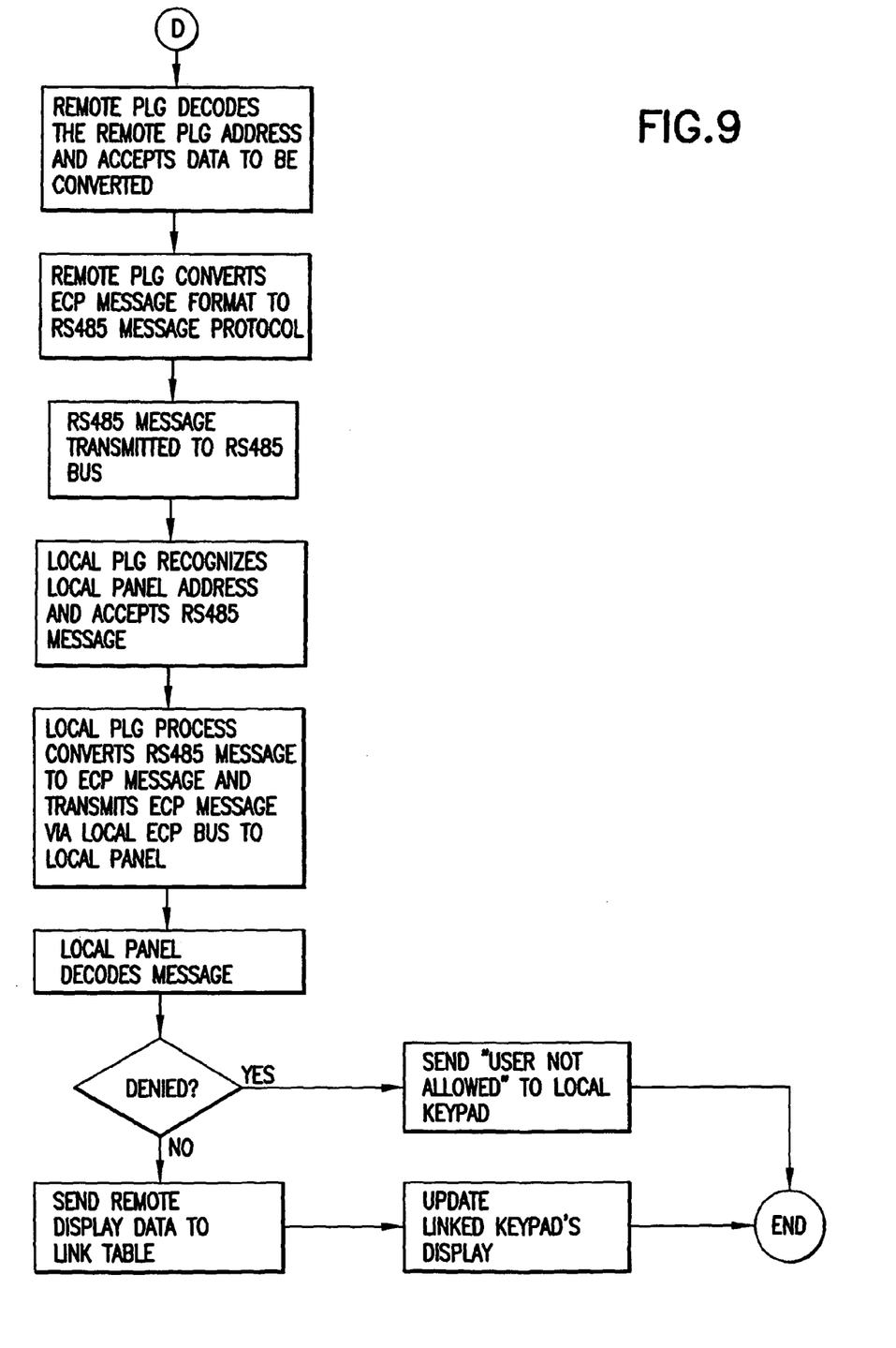

FIGS. 7-9 contain an operational flowchart of security system 1. Once an installer has programmed the panels 12 with addresses of the PLGs 14 and the keypads 16, and performed other standard installation operations, a user may initiate a linking operation. The user punches a user code and "#" sign followed by an 86 into a local keypad 12 to initiate the link mode (local components are located in the building the user is in, while remote components are located in a different building). The local panel 12 clears the link bit for the local keypad 16 in the table of associated user interfaces and adds the remote panel #, the remote partition #, the local keypad bit map, and the remote partition display data from the link message to the table linked user interfaces. The local panel 12 receives the keypad codes via the local ECP bus 10 and decodes them to start a linking operation. Upon prompting by the local panel 12 the user enters the panel # to link to, the partition # to link to, and the remote panel ID into the local keypad 16, which is sent to the local panel 12. The local panel 12 generates a panel link request message data packet containing the data type of 06h, the destination panel #, the source panel #, the destination partition #, the user ID and the user code. The local panel 12 transmits the panel link request message to the local PLG 14 via the local ECP data bus 10. The local PLG 14 recognizes the PLG address in the data on the ECP data bus 10 and accepts the data packet to be transmitted to the RS485 data bus 8. The local PLG 14 converts the panel link request message to the RS485 protocol and transmits it to the RS485 data bus 8. The remote PLG 14 recognizes the remote panel address in the message and accepts the RS485 message. The remote PLG 14 converts the RS485 message to an ECP message and transmits the ECP message to the remote panel 12 via the remote ECP data bus 10 when the remote panel 12 requests data. The remote panel 12 reads the ECP message and decodes the message as a link request message.

The remote panel 12 checks to see if the user is allowed access to the partition he is trying to link to. This information has been programmed during installation. If the user is not allowed access to the partition, the remote panel 12 generates a link request denied message. If the user is allowed access to the partition, the remote panel generates a link message containing display data from the remote partition, the remote panel #, the remote partition #, and the local panel # to send the message. The panel then transmits the message to the remote PLG 14 via the remote ECP data bus 10. The remote PLG 14 decodes the remote PLG address and accepts the data to be converted to the RS485 format. The remote PLG 14 converts the ECP message format to RS485 format and transmits it to the RS485 bus 8. The local PLG 14 recognizes the local panel address and accepts the RS485 message. The local PLG 14 converts the RS485 message to an ECP message and transmits the ECP message to the local panel 12 via the ECP bus 10 when the local panel 12 requests the data. The local panel 12 decodes the message and determines if the link request was denied. If the link request was denied, the local panel 12 sends a "user not allowed" message to the local keypad 16 via the ECP bus 10. The local panel 12 then sends the display data message to the local keypad 16 via the Link Table. At this point the user can control the remote partition and see status from the remote partition as if the keypad 16 is part of the remote security subsystem 2, 4, or 6. The commands the user puts into the local keypad 16, when it is linked to the remote partition, are transmitted to the remote panel. The remote panel acts on these key strokes as if they come from its own keypads.

Provided with the information above, one skilled in the art will be able to generate the specific code for the software routines for generating link messages, determining if too many links exist, decoding keypad messages, decoding link messages, exiting the link mode, checking the user ID, programming addresses and bit maps, resetting components, getting component status, and providing supervision control by the security subsystems 2, 4, and 6.

It will be apparent to those skilled in the art that modifications to the specific embodiment described herein may be made while still being within the spirit and scope of the present invention. For example, other user interfaces with similar features to the keypads 16 may be linked to remote panels 12. The security subsystems 2, 4, and 6 may contain any number of different components on the ECP bus 10, and there maybe any number of security subsystem 2, 4, and 6 or other devices connected to the RS485 bus. The RS485 bus 8 may have clash detection. The security subsystems 2, 4, and 6 may use a different local bus than the ECP bus 10 and the PLG 14 may interface to the local bus in a different manner. The data formats and the data packet formats may also be different. Lastly, the table of associated user interfaces for the associated user interfaces and the table of linked user interfaces for the linked keypads 16 may be of a different structure and may contain different information but still allow the panel 12 to maintain which keypads 16 are linked to remote panels 12.

It is also envisioned that the present invention may be implemented using existing communications infrastructures such as a wide area network (WAN) such as the Internet, local area networks (LANs), and the like. Such communications may be employed using a wired connection such as dial-up connections over existing telephone wires, fiber optics, wireless satellite systems, DSL, cable modem, etc.

We claim:

1. An alarm security system for monitoring a plurality of premises, comprising a plurality of security subsystems, each of said security subsystems being discretely located, and a system communications bus interconnected to each of said security subsystems to enable bi-directional communication directly between any two of said security subsystems, wherein each of said security subsystems comprises:
   a) a local communications bus,
   b) a plurality of user interface devices connected to said local communications bus, each of said user interface devices comprising input devices that allow a user to input commands for controlling operation of a security subsystem,
   c) a plurality of sensor devices connected to said local communications bus, each of said sensor devices adapted to monitor an area under surveillance and sense if an intruder has entered said area under surveillance and generate an intrusion signal accordingly,
   d) a panel linking gateway connected to said local communications bus and to the system communication bus, said panel linking gateway adapted to selectively transfer data between said local communications bus and said system communication bus; and
   e) a control panel connected to said local communications bus comprising:
      processing circuitry adapted to receive intrusion signals from said sensor devices and determine if an alarm message should be generated;
      a memory indicating, for each of said plurality of user interface devices, if a user interface device is associated with said security subsystem or is linked to a different security subsystem;
      wherein user interface devices that are associated with said security subsystem interact only with said security subsystem, and wherein user interface devices that are linked to a different security subsystem interact only with said different security subsystem via said panel linking gateway and said system communication bus; and
      wherein said processing circuitry is further adapted to link a user interface device associated with said security subsystem to a different security subsystem on request of a user.

2. The security system of claim 1 wherein said local communications bus uses a first protocol for communications, said system communications bus uses a second protocol for communications, and said panel linking gateway allows communication between the local communications bus and the system communications bus.

3. The security system of claim 2 wherein said panel linking gateway reads data from said local communications bus, processes the data from said first protocol to conform to said second protocol, and transmits the processed data to said system communications bus.

4. The security system of claim 2 wherein said panel linking gateway reads data from said system communications bus, processes the data from said second protocol to conform to said first protocol, and transmits the processed data to said local communications bus.

5. The security system of claim 2 wherein said second protocol is an RS485 standard communications protocol.

6. The security system of claim 1 wherein said system communications bus comprises a wide area network.

7. The security system of claim 6 wherein said wide area network is the Internet.

8. The security system of claim 1 wherein said system communications bus interoperates over a telephone network.

9. The security system of claim 1 wherein said system communications bus interoperates over a fiber optics network.

10. The security system of claim 1 wherein said system communications bus interoperates over a satellite network.

11. The security system of claim 1 wherein said system communications bus interoperates in conjunction with a cable modem.

12. The security system of claim 1 wherein said sensor devices comprise a motion sensor.

13. The security system of claim 1 wherein said sensor devices comprise a window sensor.

14. The security system of claim 1 wherein said sensor devices comprise a door sensor.

15. The security system of claim 1 wherein said sensor devices comprise a glass break detector.

* * * * *